United States Patent
Xie et al.

(10) Patent No.: US 10,568,042 B2
(45) Date of Patent: Feb. 18, 2020

(54) DATA TRANSMISSION METHOD AND NETWORK DEVICE THEREOF

(71) Applicant: Huawei Technologies Co., Ltd., Shenzhen (CN)

(72) Inventors: Xinqian Xie, Beijing (CN); Zhiheng Guo, Beijing (CN); Xingqing Cheng, Beijing (CN); Leiming Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/272,522

(22) Filed: Feb. 11, 2019

(65) Prior Publication Data
US 2019/0174424 A1 Jun. 6, 2019

Related U.S. Application Data

(63) Continuation of application No. PCT/CN2016/094969, filed on Aug. 12, 2016.

(51) Int. Cl.
*H04W 52/16* (2009.01)
*H04L 27/20* (2006.01)
(Continued)

(52) U.S. Cl.
CPC ......... *H04W 52/16* (2013.01); *H04L 27/2082* (2013.01); *H04W 52/143* (2013.01); *H04W 52/24* (2013.01)

(58) Field of Classification Search
CPC ... H04W 52/16; H04W 52/243; H04W 52/24; H04L 27/2082
(Continued)

(56) References Cited

U.S. PATENT DOCUMENTS

| 5,381,449 A | * | 1/1995 | Jasper | H04L 5/0048 332/103 |
| 7,187,717 B2 | * | 3/2007 | Brossier | H04L 1/0003 375/260 |

(Continued)

FOREIGN PATENT DOCUMENTS

| CN | 1878018 A | 12/2006 |
| CN | 102595421 A | 7/2012 |
| CN | 104052709 A | 9/2014 |

OTHER PUBLICATIONS

"New Study Item SI Proposal: Study on Downlink Enhanced Multiuser Superposition Transmissions and Network Assisted Interference Cancellation for LTE," 3GPP TSG RAN Meeting #67 RP-150496, Shanghai, China, 3rd Generation Partnership Project, Valbonne, France (Mar. 9-12, 2015).

(Continued)

*Primary Examiner* — Hai V Nguyen
(74) *Attorney, Agent, or Firm* — Leydig, Voit & Mayer, Ltd.

(57) ABSTRACT

A data transmission method includes: allocating, based on a power ratio value of near user equipment to far user equipment in two paired user equipments, a transmit power to each of the near user equipment and the far user equipment, where the power ratio value is a ratio in a first ratio set, at least one ratio in the first ratio set can be selected from a second ratio set. A plurality of power ratio values of near user equipment to far user equipment in two paired user equipments can be provided.

14 Claims, 4 Drawing Sheets

(51) Int. Cl.
*H04W 52/14* (2009.01)
*H04W 52/24* (2009.01)

(58) Field of Classification Search
USPC ........................................................ 455/522
See application file for complete search history.

(56) References Cited

U.S. PATENT DOCUMENTS

| | | | |
|---|---|---|---|
| 9,614,711 B2* | 4/2017 | Zhu | H04W 72/0473 |
| 10,050,683 B2* | 8/2018 | Hwang | H04L 5/0044 |
| 10,193,735 B2* | 1/2019 | Kwon | H04L 1/0001 |
| 10,212,020 B2* | 2/2019 | Kwon | H04L 1/0001 |
| 10,257,013 B2* | 4/2019 | Hwang | H04L 5/0044 |
| 10,374,771 B2* | 8/2019 | Zhu | H04W 72/0446 |
| 2003/0099302 A1* | 5/2003 | Tong | H03M 13/258 375/264 |
| 2004/0039983 A1* | 2/2004 | Brossier | H04L 1/0003 714/758 |
| 2014/0044091 A1 | 2/2014 | Kishiyama | |
| 2014/0270014 A1 | 9/2014 | Xue et al. | |
| 2015/0092882 A1 | 4/2015 | Lee et al. | |
| 2016/0182152 A1* | 6/2016 | Sofman | H04B 10/2513 398/27 |
| 2016/0182202 A1* | 6/2016 | Patel | H04L 5/0048 370/330 |
| 2016/0204969 A1* | 7/2016 | Zhu | H04W 52/262 375/261 |
| 2016/0366003 A1* | 12/2016 | Kwon | H04L 1/0001 |
| 2016/0366691 A1* | 12/2016 | Kwon | H04L 1/0001 |
| 2017/0048840 A1* | 2/2017 | Hwang | H04L 5/0044 |
| 2017/0048841 A1* | 2/2017 | Hwang | H04L 5/0044 |
| 2017/0180097 A1* | 6/2017 | Zhu | H04L 1/001 |
| 2018/0191549 A1* | 7/2018 | Schober | H04L 27/3416 |
| 2018/0192424 A1* | 7/2018 | Zhang | H04L 27/3411 |
| 2018/0212802 A1* | 7/2018 | Guo | H04W 72/12 |
| 2018/0262288 A1* | 9/2018 | Gao | H04J 7/00 |
| 2018/0310252 A1* | 10/2018 | Wu | H04W 52/346 |
| 2019/0173724 A1* | 6/2019 | Kwon | H04L 1/0001 |
| 2019/0173725 A1* | 6/2019 | Kwon | H04L 1/0001 |
| 2019/0245646 A1* | 8/2019 | Robert Safavi | H04J 11/004 |
| 2019/0280904 A1* | 9/2019 | Guo | H04L 25/03006 |

OTHER PUBLICATIONS

"3rd Generation Partnership Project; Technical Specification Group Radio Access Network; Evolved Universal Terrestrial Radio Access (E-UTRA); Physical channels and modulation(Release 13)," 3GPP TS 36.211 V13.2.0, pp. 1-168, 3rd Generation Partnership Project, Valbonne, France (Jun. 2016).

"3rd Generation Partnership Project; Technical Specification Group Radio Access Network; Evolved Universal Terrestrial Radio Access (E-UTRA); Multiplexing and channel coding(Release 13)," 3GPP TS 36.212 V13.2.0, pp. 1-140, 3rd Generation Partnership Project, Valbonne, France (Jun. 2016).

"Power ratio design for MUST," 3GPP TSG RAN WG1 #85, R1-164435, 3rd Generation Partnership Project, Valbonne, France (May 23-27, 2016).

"Discussion on power ratios optimization for MUST scheme," 3GPP TSG RAN WG1 Meeting #85, R1-165831, XP051112000, Nanjing, China, 3rd Generation Partnership Project, Valbonne, France (May 30, 2016).

"Discussion on power ratios for MUST," 3GPP TSG RAN WG1 Meeting #85, Nanjing, China, XP051096605, 3rd Generation Partnership Project, Valbonne, France (May 23-27, 2016).

"Selection of Power Ratios and Modulation for MUST PDSCH," 3GPP TSG RAN WG1 Meeting #85, Nanjing, China, R1-164977, XP051096787, 3rd Generation Partnership Project, Valbonne, France (May 23-27, 2016).

"3rd Generation Partnership Project; Technical Specification Group Radio Access Network; Study on Downlink Multiuser Superposition Transmission (MUST) for LTE(Release 13)," 3GPP TR 36.859, vol. V13.0.0, XP051294865, 3rd Generation Partnership Project, Valbonne, France (Dec. 2015).

* cited by examiner

FIG. 1

Allocate, based on a power ratio value of near user equipment to far user equipment in two paired user equipments, a transmit power to each of the near user equipment and the far user equipment, where the power ratio value is a ratio in a first ratio set, at least one ratio in the first ratio set can be selected from a second ratio set, and the second ratio set is a set including power ratio values represented by selectable composite constellation points at intervals of 1 in a constellation diagram — 210

Perform data transmission based on the transmit power of the near user equipment and the transmit power of the far user equipment — 220

DATA TRANSMISSION METHOD AND NETWORK DEVICE THEREOF

CROSS-REFERENCE TO RELATED APPLICATIONS

This application is a continuation of International Application No. PCT/CN2016/094969, filed on Aug. 12, 2016, the disclosure of which is hereby incorporated by reference in its entirety.

TECHNICAL FIELD

Embodiments of the present invention relate to the communications field, and more specifically, to a data transmission method and a network device thereof.

BACKGROUND

In a Long Term Evolution (LTE) or Long Term Evolution Advanced (LTE-A) communications system, a downlink multiple access manner is usually an orthogonal frequency division multiple access (OFDMA) manner. A main characteristic of the orthogonal frequency division multiple access manner is that different user equipments use different time-frequency resources, to ensure that there is no interference with signal reception between the different user equipments, thereby implementing simple reception on a user equipment side. However, when communication is performed by using the orthogonal frequency division multiple access manner, utilization of the time-frequency resources is relatively low. Consequently, an overall transmission rate of the communications system is limited.

A transmission manner of non-orthogonal multiple access (NOMA) can be used to transmit information about a plurality of user equipments on a single resource unit. Compared with OFDMA, NOMA improves the overall transmission rate of the system. Further, in a transmission manner of semi-orthogonal multiple access (SOMA), a user equipment receiver is enabled, by using a characteristic of a Gray code in an existing modulation (or a constellation diagram) scheme, to use a simple receive algorithm, thereby further improving system performance. Some downlink transmission schemes including NOMA and SOMA are also collectively referred to as multi-user equipment superposition transmission (MUST).

In MUST communication in an LTE or LTE-A system, pairing between two or more user equipments is allowed. A base station transmits information to these user equipments on a same time-frequency resource, so that signals sent by the base station to the user equipments share a transmit power of the base station on the time-frequency resource. When two user equipments are paired with each other, powers at which the base station sends signals to the two user equipments may be different. Considering that compared with a far user equipment, a near user equipment is closer to the base station and has a better channel condition, to ensure that both the far and near user equipments can perform reliable transmission, the base station usually allocates a smaller downlink transmit power to the near user equipment, and allocates a larger downlink transmit power to the far user equipment.

Because a total transmit power of the far user equipment and the near user equipment of the base station is determined, the base station needs to determine a downlink transmit power ratio of the near user equipment to the far user equipment before sending downlink signals.

SUMMARY

Embodiments of the present invention provide a data transmission method, so that a power ratio value of near user equipment to far user equipment in two paired user equipments can be provided, and data transmission is performed based on the power ratio value.

According to a first aspect, a data transmission method is provided. The method includes: allocating, based on a power ratio value of near user equipment to far user equipment in two paired user equipments, a transmit power to each of the near user equipment and the far user equipment, where the power ratio value is a ratio in a first ratio set, at least one ratio in the first ratio set can be selected from a second ratio set, and the second ratio set is a set including power ratio values represented by selectable composite constellation points at intervals of 1 in a constellation diagram; and performing data transmission based on the transmit power of the near user equipment and the transmit power of the far user equipment.

Therefore, this embodiment of the present invention provides the data transmission method, so that a plurality of power ratio values of the near user equipment to the far user equipment in the two paired user equipments can be provided, thereby increasing flexibility of power allocation by a base station to the near user equipment and the far user equipment, and helping increase a performance gain that can be obtained by MUST transmission.

With reference to the first aspect, in a first possible implementation of the first aspect, when the far user equipment uses a quadrature phase shift keying modulation (QPSK) scheme and the near user equipment uses the QPSK scheme, the second ratio set is: {121:289, 49:121, 81:225, 121:361, 25:81, 49:169, 81:289, 81:361, 49:225, 25:121, 9:49, 49:289, 25:169, 49:361, 49:529, 25:289, 9:121, 25:361, 25:441, 9:169}.

With reference to the first aspect and the foregoing implementation of the first aspect, in a second possible implementation of the first aspect, when the far user equipment uses a QPSK scheme and the near user equipment uses a quadrature amplitude modulation 16QAM scheme including 16 symbols, the second ratio set is: {45:121, 45:169, 1:5, 45:289, 45:441, 5:49, 5:81}.

With reference to the first aspect and the foregoing implementations of the first aspect, in a third possible implementation of the first aspect, when the far user equipment uses a QPSK scheme and the near user equipment uses a quadrature amplitude modulation 64QAM scheme including 64 symbols, the second ratio set is: {21:81, 21:121, 21:169, 21:225, 21:289, 21:361}.

With reference to the first aspect and the foregoing implementations of the first aspect, in a fourth possible implementation of the first aspect, the first ratio set is any one of the following sets: {1:4, 1:9, 1:16, 81:225}; {1:4, 1:9, 81:225}; {1:4, 1:9, 1:16, 121:361}; {1:4, 1:9, 121:361}; {1:4, 1:9, 1:16, 121:289}; {1:4, 1:9, 121:289}; {1:4, 1:9, 1:16, 25:81}; and {1:4, 1:9, 25:81}.

With reference to the first aspect and the foregoing implementations of the first aspect, in a fifth possible implementation of the first aspect, the first ratio set is any one of the following sets: {5:11, 5:49, 5:81}; {5:11, 5:49, 5:81, 1:5}; and {5:11, 5:49, 1:5}.

With reference to the first aspect and the foregoing implementations of the first aspect, in the second possible implementation of the first aspect, the first ratio set includes: {21:64, 21:121, 21:225, 21:361}; {21:64, 21:121, 21:225}; {21:64, 21:121, 21:361}; and {21:64, 21:121}.

According to a second aspect, a network device is provided. The network device is configured to perform the method according to the first aspect or any possible implementation of the first aspect. Specifically, the network device includes units configured to perform the method according to the first aspect or any possible implementation of the first aspect.

According to a third aspect, a sending apparatus is provided. The apparatus includes: a memory, a processor, and a bus system. The memory is connected to the processor by using the bus system. The memory is configured to store an instruction. The processor is configured to execute the instruction stored in the memory, and when the processor executes the instruction stored in the memory, the execution enables the processor to perform the method according to the first aspect or any possible implementation of the first aspect.

According to a fourth aspect, a computer readable medium is provided. The computer readable medium is configured to store a computer program. The computer program includes an instruction used for performing the method according to the first aspect or any possible implementation of the first aspect.

DESCRIPTION OF EMBODIMENTS

The following clearly describes technical solutions in embodiments of the present invention with reference to the accompanying drawings. The described embodiments are a part rather than all of the embodiments of the present invention. Other embodiments obtained by a person of ordinary skill in the art based on the described embodiments of the present invention without creative efforts may fall within the protection scope of the present invention.

Figure 1:
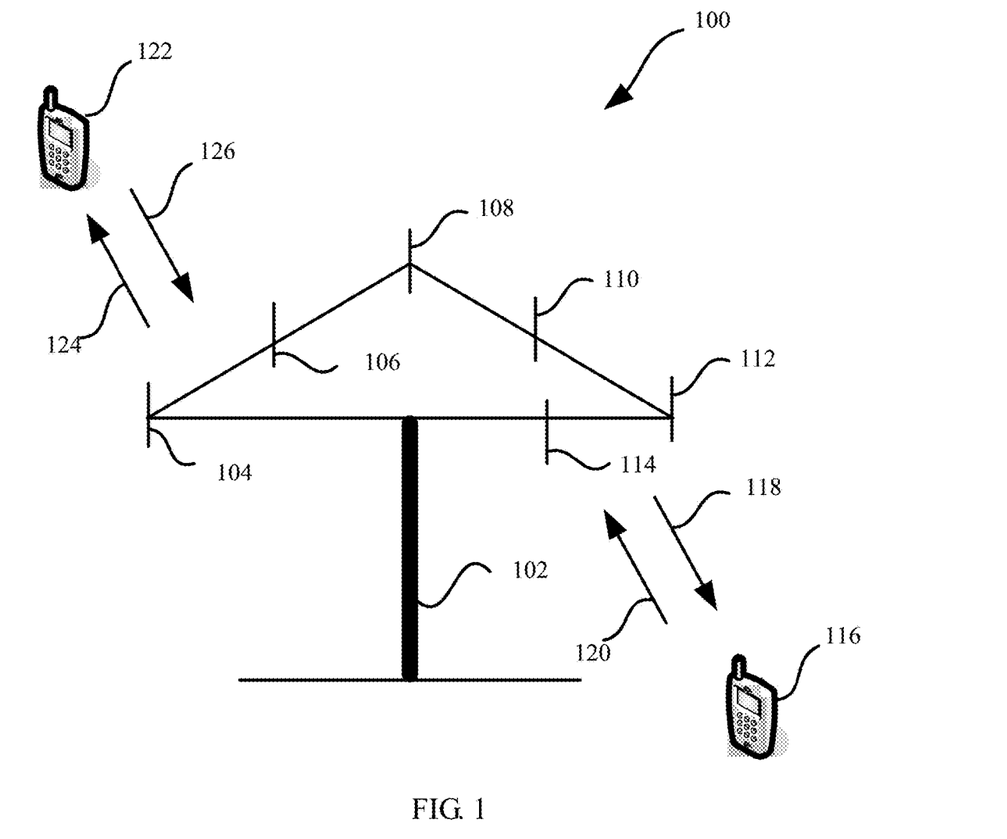
FIG. 1 is a schematic diagram of a wireless communications system according to embodiments of this specification.

FIG. 1 is a schematic diagram of a wireless communications system according to embodiments of this specification.

Multiple embodiments are now described with reference to the accompanying drawings, and same components in this specification are indicated by a same reference numeral. In the following description, for ease of explanation, many specific details are provided to facilitate comprehensive understanding of one or more embodiments. However, embodiments need not necessarily be implemented by using these specific details. In other examples, a well-known structure and device may be shown in a form of block diagrams, to conveniently describe one or more embodiments.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or far process and according to, for example, a signal having one or more data packets (for example, data from two components interacting with another component in a local system, a distributed system, and/or across a network such as the Internet interacting with other systems by using the signal).

In addition, the embodiments are described with reference to a base station. A base station can be used to communicate with a mobile device; and the base station may be a base transceiver station (BTS) in Global System of Mobile communication (GSM) or Code Division Multiple Access (CDMA); or may be an NodeB (NB) in Wideband Code Division Multiple Access (WCDMA); or may further be an Evolved Node B (eNB or eNodeB) in Long Term Evolution (LTE), a relay station or an access point, a base station device in a future 5G network, or the like. In addition, an access terminal is used to describe the embodiments. The access terminal may also be referred to as a system, a subscriber unit, a subscriber station, a mobile station, a mobile console, a far station, a far terminal, a mobile device, a user terminal, a terminal, a wireless communications device, user agent, a user apparatus, or user equipment (UE). The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device, or another processing device connected to a wireless modem.

In addition, aspects or features of the present invention may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a Compact Disk (CD), a Digital Versatile Disk (DVD), a smart card and a flash memory component (for example, Erasable Programmable Read-Only Memory (EPROM), a card, a stick, or a key drive). In addition, various storage media described in this specification may indicate one or more devices and/or other machine-readable media that is used to store information. The term "machine-readable media" may include but is not limited to a radio channel, and various other media that can store, contain and/or carry an instruction and/or data.

Now, referring to FIG. 1, FIG. 1 shows a wireless communications system 100 according to the embodiments of this specification. The wireless communications system 100 includes a base station 102. The base station 102 may include a plurality of antenna groups. Each antenna group may include one or more antennas. For example, one antenna group may include antennas 104 and 106, another antenna group may include antennas 108 and 110, and an additional group may include antennas 112 and 114. For each antenna group, two antennas are shown in FIG. 1. However, more or fewer antennas may be used for each group. The base station 102 may additionally include a transmitter chain and a receiver chain. A person of ordinary skill in the art can understand that the transmitter chain and the receiver chain may both include a plurality of components (for example, a processor, a modulator, a multiplexer, a demodulator, a demultiplexer, or an antenna) related to signal transmission and reception.

The base station 102 may communicate with one or more access terminals (for example, an access terminal 116 and an access terminal 122). However, it can be understood that the base station 102 may communicate with any quantity of access terminals similar to the access terminal 116 or 122. The access terminals 116 and 122 may each be, for example, a cellular phone, a smartphone, a portable computer, a handheld communications device, a handheld computing device, a satellite radio apparatus, a global positioning system, a PDA, and/or any other suitable device configured to perform communication on the wireless communications system 100. As shown in the figure, the access terminal 116 communicates with the antennas 112 and 114. The antennas 112 and 114 send information to the access terminal 116 by using a forward link 118, and receive information from the access terminal 116 by using a reverse link 120. In addition, the access terminal 122 communicates with the antennas 104 and 106. The antennas 104 and 106 send information to the access terminal 122 by using a forward link 124, and receive information from the access terminal 122 by using a reverse link 126. In an Frequency Division Duplex (FDD) system, for example, the forward link 118 may use a frequency band different from a frequency band used by the reverse link 120, and the forward link 124 may use a frequency band different from a frequency band used by the reverse link 126. In addition, in a Time Division Duplex (TDD) system, the forward link 118 and the reverse link 120 may use a same frequency band, and the forward link 124 and the reverse link 126 may use a same frequency band.

Each group of antennas and/or an area designed for communication is referred to as a sector of the base station 102. For example, an antenna group may be designed to communicate with an access terminal in a sector of a coverage area of the base station 102. In a process in which the base station 102 communicates with the access terminals 116 and 122 respectively by using the forward links 118 and 124, a transmit antenna of the base station 102 may improve signal-to-noise ratios of the forward links 118 and 124 by using beamforming. In addition, compared with a manner in which the base station sends signals to all access terminals of the base station by using a single antenna, when the base station 102 sends, by using beamforming, signals to the access terminals 116 and 122 that are randomly distributed in a related coverage area, relatively little interference is imposed on a mobile device in a neighboring cell.

At a given time, the base station 102, the access terminal 116, or the access terminal 122 may be a wireless communications sending device and/or a wireless communications receiving device. When sending data, the wireless communications sending device may encode the data for transmission. Specifically, the wireless communications sending device may obtain (for example, generate, receive from another communications apparatus, or store in a memory) a particular quantity of data bits to be sent, by using a channel, to the wireless communications receiving device. Such data bits may be included in a transport block (or a plurality of transport blocks) of data, and the transport block may be segmented to generate a plurality of code blocks.

Figure 2:
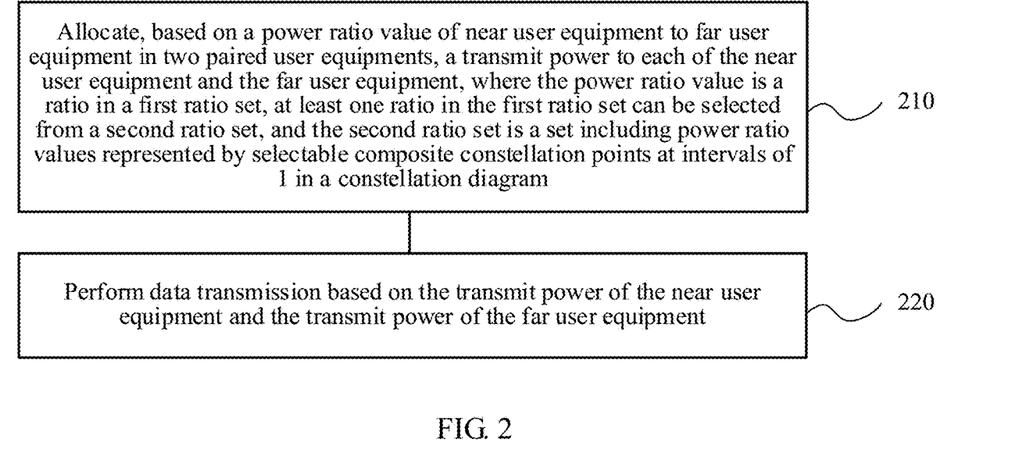
FIG. 2 is a schematic flowchart of a method according to an embodiment of the present invention.

FIG. 2 is a schematic flowchart of a method according to an embodiment of the present invention. The method may be performed by a base station. As shown in FIG. 2, the method 200 includes the following steps.

Step 210: Allocate, based on a power ratio value of near user equipment to far user equipment in two paired user equipments, a transmit power to each of the near user equipment and the far user equipment, where the power ratio value is a ratio in a first ratio set, at least one ratio in the first ratio set can be selected from a second ratio set, and the second ratio set is a set including power ratio values represented by selectable composite constellation points at intervals of 1 in a constellation diagram.

It should be noted that each ratio in the first ratio set may be a power ratio value of the near user equipment to the far user equipment, a power ratio value of the far user equipment to the near user equipment, a power ratio value of a power of the near user equipment to a sum of powers of the near user equipment and the far user equipment, or a power ratio value of a power of the far user equipment to a sum of powers of the near user equipment and the far user equipment. This is not limited in the present invention.

Step 220: Perform data transmission based on the transmit power of the near user equipment and the transmit power of the far user equipment.

Specifically, in step 210, the near user equipment is user equipment relatively close to the base station, and the far user equipment is user equipment relatively distant from the base station. In a MUST communications system in an LTE or LTE-A system, when the near user equipment and the far user equipment are paired with each other, the base station sends signals to the paired near user equipment and far user equipment on a same time-frequency resource. When the base station sends signals to the user equipments, the transmit power of the near user equipment and the transmit power of the far user equipment of the base station need to be determined. Because a total transmit power of the far user equipment and the near user equipment of the base station is determined, the transmit power of the near user equipment of the base station and the transmit power of the far user equipment of the base station can be respectively determined provided that the power ratio value of the near user equipment to the far user equipment of the base station is determined.

Specifically, in step 210, elements in the second set are the power ratio values represented by composite constellation points in a constellation diagram including 1024 grid points at intervals of 1. The composite constellation points refer to constellation points composed and mapped onto the constellation diagram after the two user equipments respectively use respective modulation schemes. For any determined composite constellation diagram, a power ratio value of a near user equipment to a far user equipment can be determined based on the composite constellation diagram.

It should be noted that the power ratio value of the near user equipment to the far user equipment of the base station may alternatively be represented in another manner, such as a normalized fraction form. For example, 121:289 may be represented as 121/410:289/410. For another example, the power ratio value may alternatively be represented in a normalized decimal form. The decimal may be a decimal reserving significant figures having a digit of any positive integer. For example, 121:289 may be represented as 0.2951:0.7049 or 0.295:0.705. Therefore, a specific representation form of the power ratio value is not limited in the present invention. All representation methods that can be equivalent to the foregoing power ratio values fall within a scope of the present invention.

Therefore, this embodiment of the present invention provides a data transmission method, so that a plurality of power ratio values of near user equipment to far user equipment in two paired user equipments can be provided, thereby increasing flexibility of a base station for the near user equipment and the far user equipment, and helping increase a performance gain that can be obtained by MUST transmission.

Figure 3:
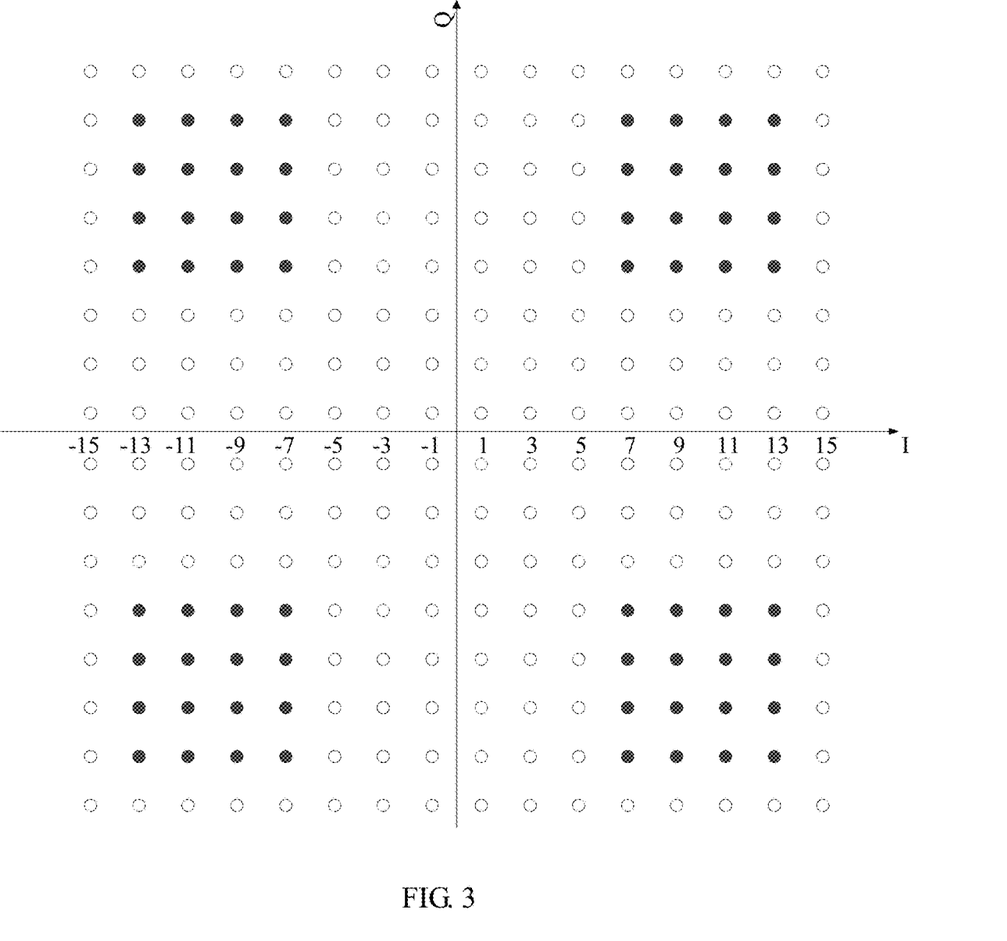
FIG. 3 is a schematic constellation diagram according to the prior art.

In existing technical solutions, a composite constellation diagram of signals of far and near users falls within 256 integer grid points at intervals of 2. Use of this method can reduce a quantity of bits representing a power value of each constellation point on a receive end, thereby reducing complexity of a multiplier of a chip in a device. The interval being 2 represents that a distance between two closest grid points in the diagram of the integer grid points is 2. Referring to FIG. 3, FIG. 3 is a schematic constellation diagram according to an embodiment of the prior art. Solid dots in the figure are a possible distribution form of a composite constellation diagram of signals of far and near users when the far user uses a quadrature phase shift keying (QPSK) modulation scheme, and the near user uses a 16-quadrature amplitude modulation (16QAM) modulation scheme. Any distribution form of the constellation diagram corresponds to a ratio of a power of the far user to a power of the near user. For example, in the constellation diagram shown in FIG. 3, a downlink transmit power ratio of the near user to the far user of the base station is 1:20.

When the far user uses the QPSK modulation scheme and the near user uses a 64QAM modulation scheme, the composite constellation diagram of the far and near users has 256 points in total. The 256 points occupy all grid points in FIG. 2. Consequently, the composite constellation diagram can correspond to only one transmit power ratio. That is, only one power ratio value can be set for paired users that perform MUST transmission. This is quite inflexible, and limits a performance gain that can be obtained by the MUST transmission.

Figure 4:
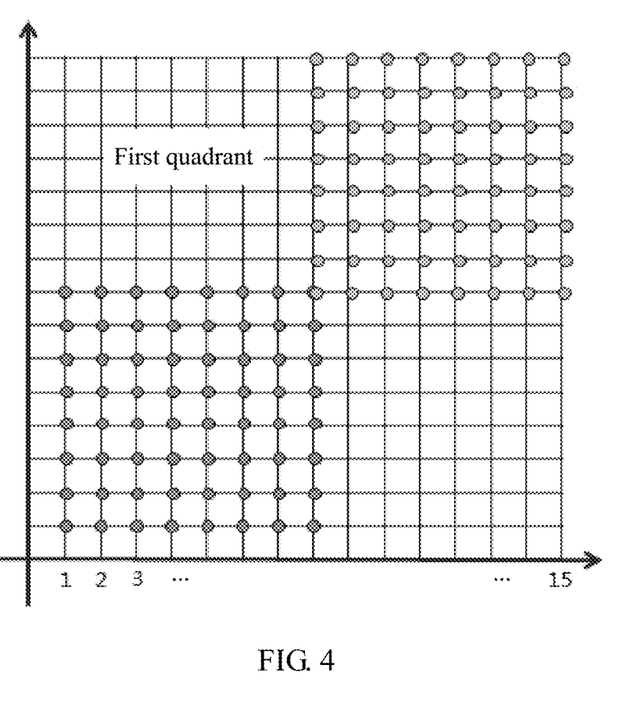
FIG. 4 is a schematic constellation diagram according to an embodiment of the present invention.

Optionally, in an embodiment of the present invention, a composite constellation diagram of signals of far and near users falls within 1024 integer grid points at intervals of 1. The interval being 1 represents that a distance between two closest grid points having a shortest distance in the integer grid points is 1. Referring to FIG. 4, FIG. 4 is a schematic constellation diagram according to an embodiment of the present invention. Because of a space limitation, only grid points in a first quadrant of a two-dimensional coordinate system are drawn in FIG. 4. Grid points in a second quadrant are symmetrical to the grid points in the first quadrant about a longitudinal axis. Grid points in a third quadrant are centrosymmetrical to the grid points in the first quadrant about an origin of coordinates. Grid points in a fourth quadrant are centrosymmetrical to the grid points in the first quadrant about a horizontal axis.

Specifically, when the far user uses the QPSK, and the near user uses the 64QAM, there may be a plurality of selections for a location of the composite constellation diagram. For example, horizontal coordinates of constellation points in the first quadrant may be respectively {1, 2, 3, 4, 5, 6, 7, 8}, or may be {8, 9, 10, 11, 12, 13, 14, 15}. For any determined composite constellation diagram, a power ratio value of the near user to the far user can be determined based on the composite constellation diagram. Because there may be a plurality of possibilities for the composite constellation diagram, there may also be a plurality of values for the ratio of transmit power of near user equipment to transmit power of far user equipment of the base station. Therefore, the power ratio value of the near user equipment to the far user equipment in two paired user equipments can be determined in this manner.

Figure 5:
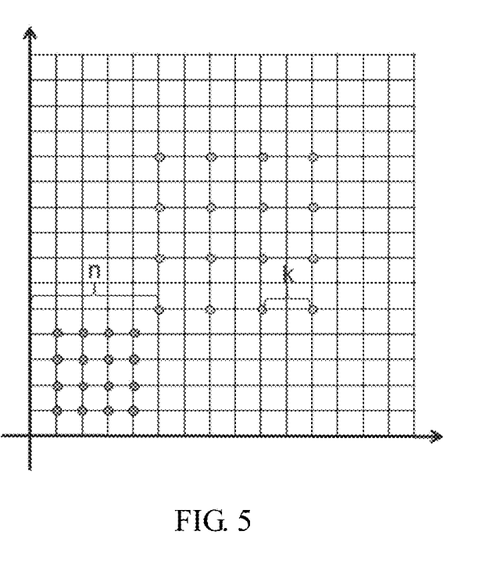
FIG. 5 is a schematic constellation diagram according to an embodiment of the present invention.

FIG. 5 is a schematic constellation diagram according to an embodiment of the present invention. As shown in FIG. 5, a composite constellation diagram of signals of far and near users falls within 1024 grid points at intervals of 1. Similar to FIG. 4, due to a space limitation, only grid points in a first quadrant of a two-dimensional coordinate system are drawn in FIG. 5.

Specifically, a first parameter n is defined to represent a quantity of grid points, occupied on a horizontal axis or a longitudinal axis, in points that are closest to an origin of coordinates and that are in composite constellation points in the first quadrant, where n is a positive integer. A second parameter k is defined to represent a quantity of grid points occupied by a distance between two closest constellation points in a composite constellation diagram in a same quadrant, where k is a positive integer. Definitions of the parameters n and k are not limited by modulation schemes of far and near users.

FIG. 5 shows distribution of constellation points when, for example, a far user uses QPSK and a near user uses 16QAM.

In a first case, when the far user uses the QPSK and the near user also uses the QPSK, a ratio value of a transmit power of the near user of a base station to a transmit power of the far user of the base station needs to satisfy the following formula:

$$0.5k^2:2(n+0.5k)^2, \text{ where } 1 \leq k \leq 15 \text{ and } 1 \leq n \leq 16-k.$$

When the far user uses the QPSK and the near user uses 16QAM, the ratio value of the transmit power of the near user of the base station to the transmit power of the far user of the base station needs to satisfy the following formula:

$$2.5k^2:2(n+1.5k)^2, \text{ where } 1 \leq k \leq 4 \text{ and } 1 \leq n \leq 16-3k.$$

When the far user uses the QPSK and the near user uses 64QAM, the ratio value of the transmit power of the near user of the base station to the transmit power of the far user of the base station needs to satisfy the following formula:

$$10.5k^2:2(n+3.5k)^2, \text{ where } 1 \leq k \leq 2 \text{ and } 1 \leq n \leq 16-7k.$$

Considering a limitation in an actual network, a power ratio of the near user to the far user needs to be greater than or equal to 1:19, and less than or equal to 3:7. Therefore, under this limitation, a possible value of a transmit power ratio of the near user to the far user of the base station can be determined based on the foregoing formula when it is determined that the near user uses a different modulation scheme.

Optionally, in an embodiment of the present invention, that a ratio is selected from the following ratios as a power ratio value of near user equipment to far user equipment in two paired user equipments includes: when the far user equipment uses a quadrature phase shift keying modulation QPSK scheme and the near user equipment uses the QPSK scheme, the power ratio value is one of the following ratios:

{121:289, 49:121, 81:121, 121:361, 25:81, 49:169, 81:289, 81:361, 49:225, 25:121, 9:49, 49:289, 25:169, 49:361, 49:529, 25:289, 9:121, 25:361, 25:441, 9:169}.

Optionally, in an embodiment of the present invention, that a ratio is selected from the following ratios as a power ratio value of near user equipment to far user equipment in two paired user equipments includes: when the far user equipment uses a QPSK scheme and the near user equipment uses a quadrature amplitude modulation 16QAM scheme including 16 symbols, the power ratio value is one of the following ratios:

{45:121, 45:169, 1:5, 45:289, 45:441, 5:49, 5:81}.

Optionally, in an embodiment of the present invention, that a ratio is selected from the following ratios as a power ratio value of near user equipment to far user equipment in two paired user equipments includes: when the far user equipment uses a QPSK scheme and the near user equipment uses a quadrature amplitude modulation 64QAM scheme including 64 symbols, the power ratio value is one of the following ratios:

{21:81, 21:121, 21:169, 21:225, 21:289, 21:361}.

Optionally, in an embodiment of the present invention, the first ratio set is any one of the following sets: {1:4, 1:9, 1:16, 81:225}; {1:4, 1:9, 81:225}; {1:4, 1:9, 1:16, 121:361}; {1:4, 1:9, 121:361}; {1:4, 1:9, 1:16, 121:289}; {1:4, 1:9, 121:289}; {1:4, 1:9, 1:16, 25:81}; and {1:4, 1:9, 25:81}.

Optionally, in an embodiment of the present invention, the first ratio set is any one of the following sets: {5:11, 5:49, 5:81}; {5:11, 5:49, 5:81, 1:5}; and {5:11, 5:49, 1:5}.

Optionally, in an embodiment of the present invention, the first ratio set is any one of the following sets: {21:64, 21:121, 21:225, 21:361}; {21:64, 21:121, 21:225}; {21:64, 21:121, 21:361}; and {21:64, 21:121}.

Therefore, when composite constellation points are selected from 256 integer grid points at intervals of 2, only one power ratio of a far user to a near user can be supported when the far user uses the QPSK modulation, and the near user uses the 64QAM modulation. However, in this embodiment of the solution of the present invention, when the composite constellation points are selected from 1024 integer grid points at intervals of 1, a maximum of nine different power ratios of the far user to the near user can be supported when the far user uses the QPSK modulation, and the near user uses the 64QAM modulation. More power ratios of the far user to the near user can also be provided in other modulation schemes. Therefore, a plurality of power ratio values of the near user equipment to the far user equipment in the two paired user equipments can be provided, thereby increasing flexibility of the base station for the near user equipment and the far user equipment, and helping increase a performance gain that can be obtained by MUST transmission.

The method for determining a power ratio value according to the embodiments of the present invention are described in detail above with reference to FIG. 1 to FIG. 5. A network device according to the embodiments of the present invention is described in detail below with reference to FIG. 6 and FIG. 7.

Figure 6:
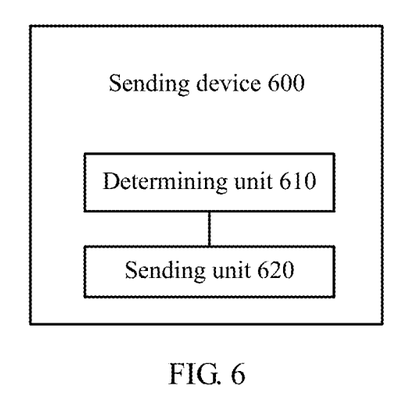
FIG. 6 is a schematic structural diagram of a network device according to an embodiment of the present invention.

FIG. 6 shows a network device 600 according to an embodiment of the present invention. The network device 600 includes:

a determining unit 610, where the determining unit 610 is configured to allocate, based on a power ratio value of near user equipment to far user equipment in two paired user equipments, a transmit power to each of the near user equipment and the far user equipment, the power ratio value is a ratio in a first ratio set, at least one ratio in the first ratio set can be selected from a second ratio set, and the second ratio set is a set including power ratio values represented by selectable composite constellation points at intervals of 1 in a constellation diagram; and a sending unit 620, where the sending unit 620 is configured to perform data transmission based on the transmit power of the near user equipment and the transmit power of the far user equipment.

It should be understood that the network device 600 herein is presented in a form of a functional unit. The term "unit" herein may refer to an application-specific integrated circuit (ASIC), an electronic circuit, a processor (for example, a shared processor, a dedicated processor, or a group processor) for executing one or more software or firmware programs, a memory, a merge logic circuit, and/or another suitable component supporting the described functions. In an optional example, a person skilled in the art can understand that the network device 600 may be specifically the base station in the foregoing embodiment, and the network device 600 can be configured to perform various procedures and/or steps corresponding to the base station in the foregoing method embodiment. To avoid repetition, details are not described herein again.

Therefore, this embodiment of the present invention provides the method for determining a power ratio value, so that a plurality of power ratio values of the near user equipment to the far user equipment in the two paired user equipments can be provided, thereby increasing flexibility of a base station for the near user equipment and the far user equipment, and helping increase a performance gain that can be obtained by MUST transmission.

Figure 7:
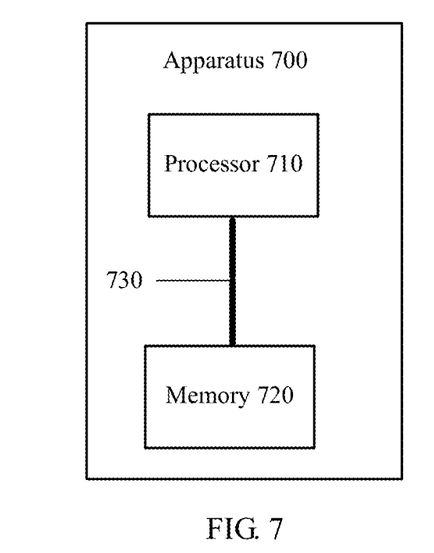
FIG. 7 is a schematic structural diagram of an apparatus according to an embodiment of the present invention.

FIG. 7 shows another apparatus 700 for determining a power ratio value according to an embodiment of the present invention. The apparatus 700 includes a processor 710, a memory 720, and a bus system 730. The processor 710 is connected to the memory 720 by using the bus system 730. The memory 720 is configured to store an instruction. The processor 710 is configured to execute the instruction stored in the memory 720.

The processor 710 is configured to perform the following processing: allocating, based on a power ratio value of near user equipment to far user equipment in two paired user equipments, a transmit power to each of the near user equipment and the far user equipment, where the power ratio value is a ratio in a first ratio set, at least one ratio in the first ratio set can be selected from a second ratio set, and the second ratio set is a set including power ratio values represented by selectable composite constellation points at intervals of 1 in a constellation diagram; and performing data transmission based on the transmit power of the near user equipment and the transmit power of the far user equipment. The memory 720 may include a read-only memory and a random access memory, and provides an instruction and data for the processor 710. Components of the sending apparatus 700 are coupled together by using the bus system 730, and in addition to a data bus, the bus system 730 further includes a power bus, a control bus, and a status signal bus. However, for clear description, various types of buses in the figure are marked as the bus system 730. For example, the apparatus 700 may be the base station 102 shown in FIG. 1. The sending apparatus 700 can implement a corresponding procedure in the foregoing method embodiment. To avoid repetition, details are not described herein again.

It should be understood that in this embodiment of the present invention, the processor 710 may be a central processing unit (CPU), or the processor 710 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any normal processor, or the like.

The memory 720 may include a read-only memory and a random access memory, and provide an instruction and data for the processor 710. A part of the memory 720 may further include a non-volatile random access memory. For example, the memory 720 may further store information of a device type.

The bus system 730 may further include a power bus, a control bus, a status signal bus, and the like, in addition to a data bus. However, for clear description, various types of buses in the figure are marked as the bus system 730.

In an implementation process, steps in the foregoing methods can be implemented by using a hardware integrated logical circuit in the processor 710, or by using instructions in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 720, and a processor 710 reads information in the memory 720 and completes the steps in the foregoing methods in combination with hardware of the processor. To avoid repetition, details are not described herein again.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

Methods or steps described in the embodiments disclosed in this specification may be implemented by hardware, a software program executed by a processor, or a combination thereof. The software program may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The present invention is described in detail with reference to the accompanying drawings and in combination with exemplary embodiments, but the present invention is not limited thereto. Various modifications or replacements can be made to the embodiments of the present invention by a person of ordinary skill in the art without departing from the spirit and essence of the present invention, and the modifications or replacements may fall within the scope of the present invention.

Additionally, statements made herein characterizing the invention refer to an embodiment of the invention and not necessarily all embodiments.

What is claimed is:

1. A data transmission method, comprising:
    allocating, by a network device, based on a power ratio value corresponding to a near user equipment and a far user equipment, a transmit power to each of the near user equipment and the far user equipment, wherein the power ratio value is a ratio in a first ratio set, at least one ratio in the first ratio set is selected from a second ratio set, and the second ratio set is a set consisting of power ratio values represented by selectable composite constellation points at intervals of 1 in a constellation diagram; and
    performing, by the network device, data transmission based on the transmit power to the near user equipment and the transmit power to the far user equipment.

2. The method according to claim 1, wherein the far user equipment uses a quadrature phase shift keying (QPSK) modulation scheme and the near user equipment uses the QPSK modulation scheme, and wherein the second ratio set is:
    {121:289, 49:121, 81:225, 121:361, 25:81, 49:169, 81:289, 81:361, 49:225, 25:121, 9:49, 49:289, 25:169, 49:361, 49:529, 25:289, 9:121, 25:361, 25:441, 9:169}.

3. The method according to claim 1, wherein the far user equipment uses a quadrature phase shift keying (QPSK) scheme and the near user equipment uses a quadrature amplitude modulation scheme comprising 16 symbols (16QAM), and wherein the second ratio set is:
    {45:121, 45:169, 1:5, 45:289, 45:441, 5:49, 5:81}.

4. The method according to claim 1, wherein the far user equipment uses a quadrature phase shift keying (QPSK) scheme and the user equipment uses a quadrature amplitude modulation scheme comprising 64 symbols (64QAM), and wherein the second ratio set is:
    {21:81, 21:121, 21:169, 21:225, 21:289, 21:361}.

5. The method according to claim 1, wherein the first ratio set is:
    {1:4, 1:9, 1:16, 81:225};
    {1:4, 1:9, 1:16, 121:361};
    {1:4, 1:9, 121:361};
    {1:4, 1:9, 1:16, 121:289};
    {1:4, 1:9, 121:289};
    {1:4, 1:9, 1:16, 25:81}; or
    {1:4, 1:9, 25:81}.

6. The method according to claim 1, wherein the first ratio set is:
    {5:11, 5:49, 5:81};
    {5:11, 5:49, 5:81, 1:5}; or
    {5:11, 5:49, 1:5}.

7. The method according to claim 1, wherein the first ratio set is:
    {21:64, 21:121, 21:225, 21:361};
    {21:64, 21:121, 21:225};
    {21:64, 21:121, 21:361}; or
    {21:64, 21:121}.

8. A network device, comprising:
    a processor, configured to allocate, based on a power ratio value corresponding to a near user equipment and a far user equipment, a transmit power to each of the near user equipment and the far user equipment, wherein the power ratio value is a ratio in a first ratio set, at least one ratio in the first ratio set is selectable from a second ratio set, and the second ratio set is a set consisting of power ratio values represented by selectable composite constellation points at intervals of 1 in a constellation diagram; and a transmitter, configured to perform data transmission based on the transmit power to the near user equipment and the transmit power to the far user equipment.

9. The network device according to claim 8, wherein the far user equipment is configured to use a quadrature phase shift keying (QPSK) modulation scheme and the near user equipment is configured to use the QPSK modulation scheme, and wherein the second ratio set is:

{121:289, 49:121, 81:225, 121:361, 25:81, 49:169, 81:289, 81:361, 49:225, 25:121, 9:49, 49:289, 25:169, 49:361, 49:529, 25:289, 9:121, 25:361, 25:441, 9:169}.

10. The network device according to claim 8, wherein the far user equipment is configured to use a quadrature phase shift keying (QPSK) scheme and the near user equipment is configured to use a quadrature amplitude modulation scheme comprising 16 symbols (16QAM), and wherein the second ratio set is:

{45:121, 45:169, 1:5, 45:289, 45:441, 5:49, 5:81}.

11. The network device according to claim 8, wherein the far user equipment uses a quadrature phase shift keying (QPSK) scheme and the near user equipment uses a quadrature amplitude modulation scheme comprising 64 symbols (64QAM), and wherein the second ratio set is:

{21:81, 21:121, 21:169, 21:225, 21:289, 21:361}.

12. The network device according to claim 8, wherein the first ratio set is:

{1:4, 1:9, 1:16, 81:225};
{1:4, 1:9, 1:16, 121:361};
{1:4, 1:9, 1:16, 121:289}; or
{1:4, 1:9, 1:16, 25:81}.

13. The network device according to claim 8, wherein the first ratio set is:

{5:11, 5:49, 5:81};
{5:11, 5:49, 5:81, 1:5}; or
{5:11, 5:49, 1:5}.

14. The network device according to claim 8, wherein the first ratio set is:

{21:64, 21:121, 21:225, 21:361};
{21:64, 21:121, 21:225}; or
{21:64, 21:121}.

* * * * *